March 4, 1958 N. L. COHEN ET AL 2,825,622

FACSIMILE RECORDER

Filed March 6, 1956 3 Sheets-Sheet 1

INVENTORS
Nathaniel L. Cohen
Joseph J. Turano

BY Charles J. Elderkin
ATTORNEY

March 4, 1958 N. L. COHEN ET AL 2,825,622

FACSIMILE RECORDER

Filed March 6, 1956 3 Sheets-Sheet 2

INVENTORS
Nathaniel L. Cohen
Joseph J. Turano

BY Charles J. Elderkin
ATTORNEY

March 4, 1958 N. L. COHEN ET AL 2,825,622

FACSIMILE RECORDER

Filed March 6, 1956 3 Sheets-Sheet 3

INVENTORS
Nathaniel L. Cohen
Joseph J. Turano

BY Charles J. Elderkin
ATTORNEY

United States Patent Office 2,825,622

Patented Mar. 4, 1958

2,825,622

FACSIMILE RECORDER

Nathaniel L. Cohen, West Hempstead, and Joseph J. Turano, Rego Park, N. Y., assignors to Air Associates, Incorporated, Teterboro, N. J.

Application March 6, 1956, Serial No. 569,868

1 Claim. (Cl. 346—136)

Figure 3:
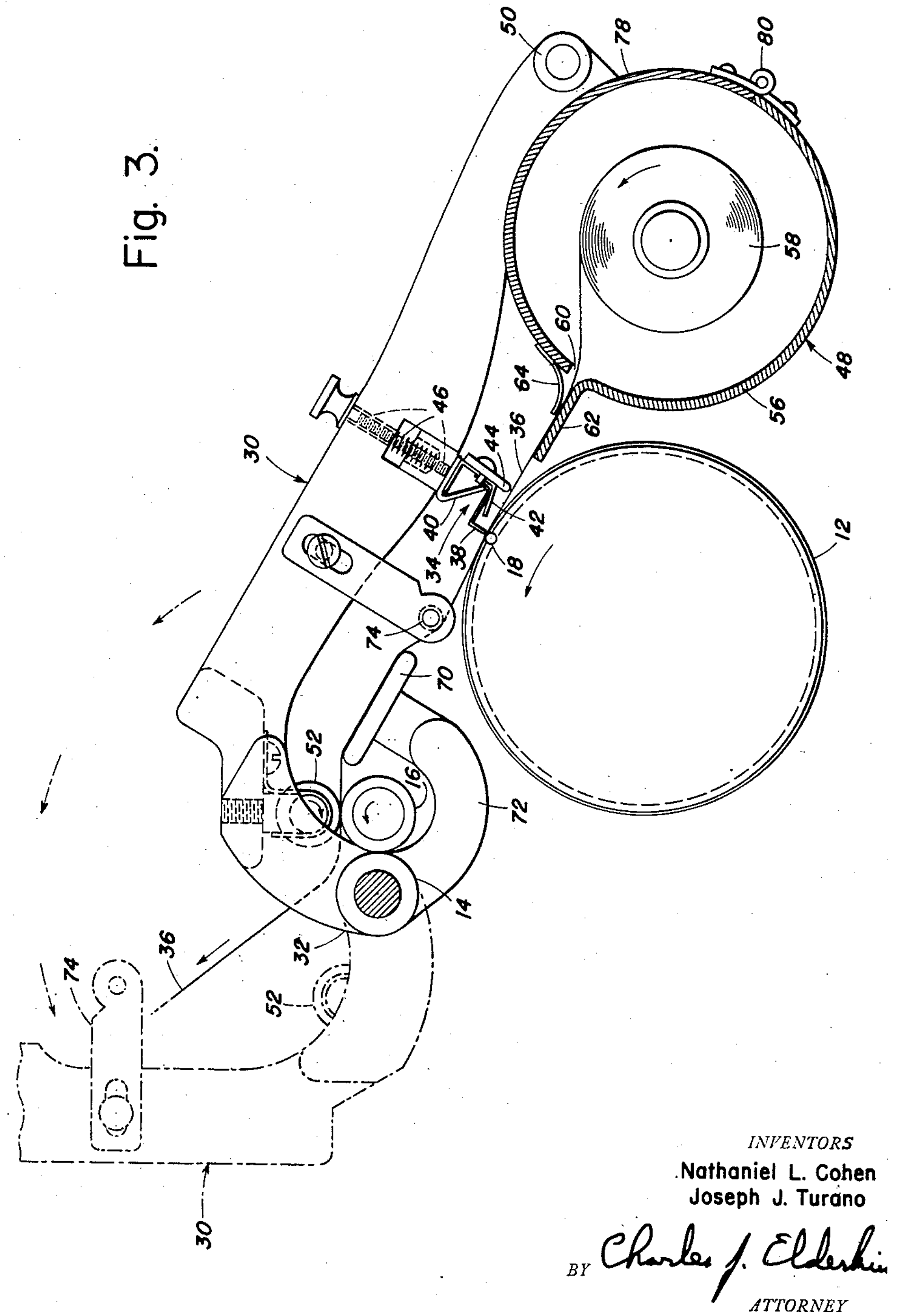

The present invention relates in general to fascimile recorders of the type employing the so-called "lawn-mower" electrode system, i. e., the arrangement wherein an electro-sensitive recording sheet is passed between a substantially stationary linear electrode or printer blade and a cooperating rotating helical electrode to effect marking of the recording sheet in response to signal intelligence transmitted to the electrodes from a suitable facsimile scanner. More particularly, the invention contemplates the provision of an improved recording paper supply and feed system and cooperating electrode system.

Heretofore, facsimile recorders employing the lawn-mower electrode system as well as many other types of recorders, were provided with recording paper supply and feed arrangements which required rather intricate threading of the recording paper between a plurality of drive and guide elements as well as between the opposed printing electrodes during loading or replacement of the paper. Furthermore, in the normal operation of facsimile recorders of the general class described it is necessary to clean the electrodes regularly as a routine maintenance requirement in order to prevent an undue accumulation of paper fiber and other insulating deposits on the electrodes with resulting impairment of printed copy. In most prior systems this cleaning procedure required removal of the recording paper from the recorder to give access to the electrodes and subsequent reloading of the machine. Similarly, occasional tearing or jamming of the recording paper within the recorder presented a serious problem in such recorders, in that, it was often necessary for an operator to remove or dismantle portions of the feed mechanism or printing mechanism to clear the machine of the damaged portions of the paper, or, at the best the operator would have to repeat the threading procedure with a fresh supply of paper.

It is the principal object of the present invention to provide, in a facsimile recorder of the general class described, an improved recording paper supply and feed system which is both simple and rugged in structure while providing ready access to all parts of the recorder requiring access for maintenance or operational demands. It is a further object of the invention to provide a paper supply and feed system which is substantially self-aligning with respect to drive and printing elements of the recorder thereby eliminating the difficulties attendant to loading of facsimile recorders as known heretofore.

In accordance with the present invention, we provide a facsimile paper supply and feed system in which the paper supply roll, linear printing electrode and all paper drive and tensioning members of the recorder, which, in the normal position of operation of the recorder are intended to overlie the recording paper, are mounted as a unitary assembly on a pivotal mounting which is adapted to be pivoted from a printing position into a servicing or loading position whereby all elements of the recording mechanism including the paper supply chamber and linear and helical electrodes are clearly exposed and accessible for maintenance or servicing. Furthermore, in the servicing or loading position of the assembly, the recording paper can be readily withdrawn from the supply roll a distance sufficient to initiate recording, and, upon closure of the assembly or return to the normal position of recording, the paper is automatically positioned for printing without the necessity of intricate threading of the paper between the electrode system and drive and tensioning members of the recorder.

Figure 2:
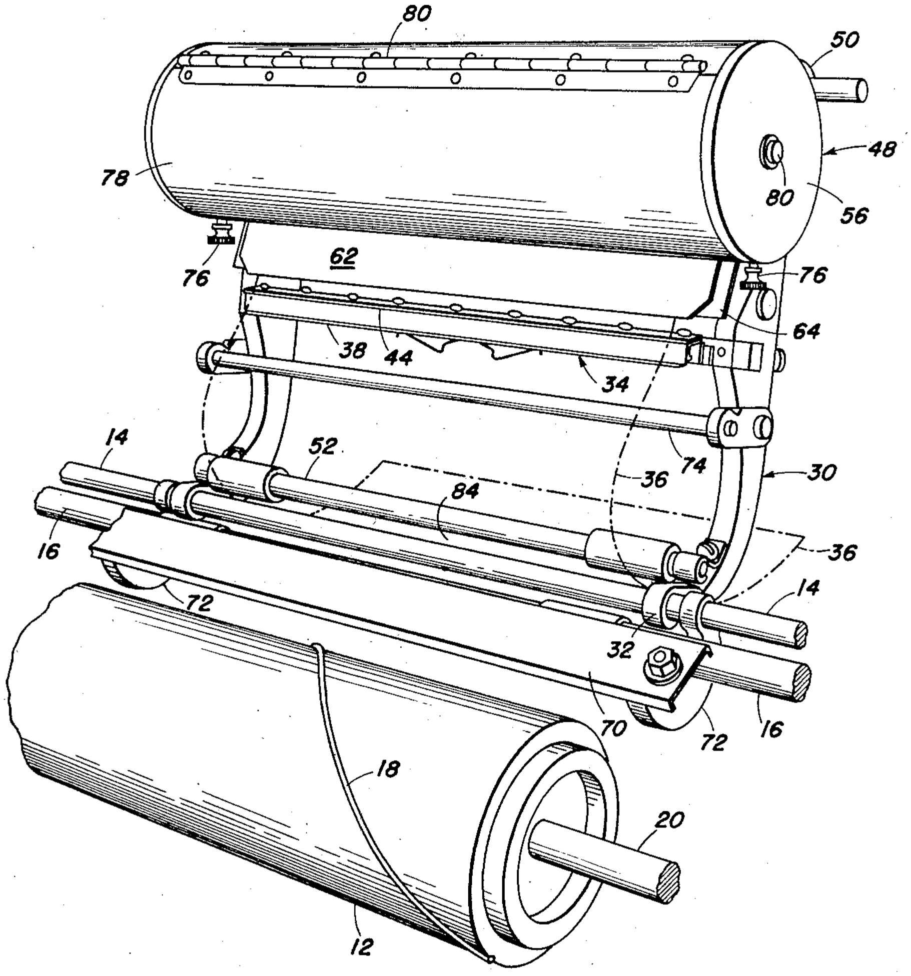
Figure 1:
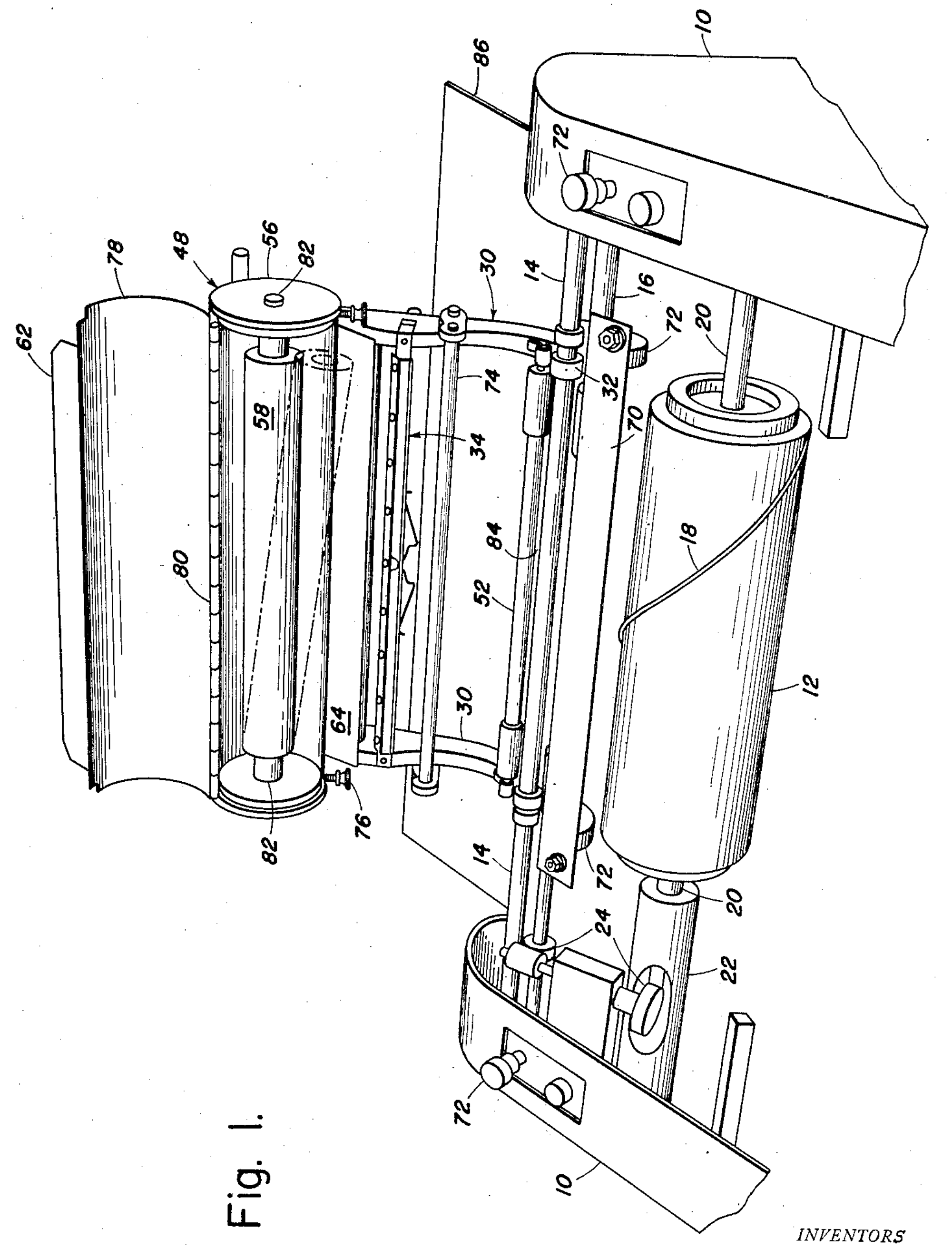

The foregoing as well as other features and objects of the invention as well as the invention itself will be best understood by reference to the following detailed description of a specific embodiment thereof taken in conjunction with the accompanying drawings, wherein:

Fig. 1 is a fragmentary perspective view of a facsimile recorder embodying the paper supply and feed system of the invention and showing the pivotal assembly of the system in an open or servicing position with the paper supply chamber also opened for loading;

Fig. 2 is a fragmentary perspective view of the electrode system and paper supply and feed system of the facsimile recorder shown in Fig. 1, wherein the pivotal assembly of the system is again shown in an open or servicing position with the paper supply chamber in a closed position and the recording paper (dotted) positioned for closure of the assembly and subsequent operation of the recorder; and Fig. 3 is a cross-sectional view of the electrode system and paper feed system of Fig. 2, taken along one end of the paper supply chamber and showing the relative interaction of the respective components of the assembly in both the lowered or printing position (solid) and the raised or servicing position (dotted).

Referring specifically to the embodiment of the drawings, a facsimile recorder is shown having a frame or body 10 of any suitable design which supports a rotating recording drum 12, a pivot bar 14 positioned near the upper rear end thereof, and a paper drive roller 16 also positioned near the upper rear end thereof. A helical electrode 18 is mounted in conventional fashion on the outer surface of the rotating recorder drum 12. Drum 12 is driven by a shaft 20 which is mounted at one end to the recorder frame 10 and at the other end within a sleeve bearing 22 which is secured to the opposite side of recorder frame 10. A suitable gear system 24 is provided for driving the paper drive roller 16 in a fixed speed relationship with respect to the speed of rotation of the recorder drum 12.

A pair of rocker arms 30 are pivotally secured at ends 32 to pivot bar 14, thereby permitting rotation between the relative position illustrated in Figs. 1 and 2 and the position illustrated in Fig. 3. A linear electrode or printer blade 34 is adjustably mounted between rocker arms 30 and is adapted to be contacted with helical electrode 18 when the assembly is positioned for recording as shown in Fig. 3 with recording paper 36 positioned between the electrodes. The detailed structure of the linear electrode assembly 34 is described and claimed in our copending patent application Serial No. 511,939, filed May 31, 1955, and entitled "Facsimile Recorder." This structure comprises a removable linear electrode element 38 formed in a generally S shape and having two separate and interchangeable electrode surfaces, blade supporting elements 40 and 42, a paper guide member 44 which serves to position the recording paper at a proper angle for recording with respect to the electrode ssytem, and spring-mounted retaining means 46 for adjustably securing the linear electrode and supporting elements to rocker arms 30.

A recording paper storage chamber 48 is mounted to rocker arms 30 near upper ends 50 thereof. An idler roller 52 is pivotally mounted between rocker arms 30 immediately adjacent the pivotal ends 36 thereof, such that when the rocker arm assembly is pivoted to a closed or recording position (Fig. 3), idler roller 52 functions to grasp the recording paper by cooperation with drive roller 16 to draw recording paper 36 from the paper storage chamber 48 containing supply roll 58.

The recording paper storage chamber 48 comprises a hollow cylindrical container 56 provided with suitable mounting brackets 82 for paper supply roll 58, an elongated paper exit slot 60 (Fig. 3), a paper baffle plate 62 bordering the exit slot 60 and positioned normal to the surface of the container 56 in the region of the exit slot 60, and flap means 64 of any suitable resilient material secured to container 56 and effectively sealing the paper exit slot 60 and interior of container 56 from atmospheric conditions. Such a seal is desirable in recorders employing moist electrolytic recording papers in order to prevent premature drying of the recording paper, and, in a similar manner, baffle plate 62 functions to shield the recording paper from premature drying during its passage from the supply chamber up to the actual point of recording.

A heater or paper drier 70 is mounted on suitable supporting brackets 72 which are, in turn, supported by pivot bar 14, the heater 70 functions to remove all moisture from printed copy prior to passage of the copy from the recorder, and may also function to catalyze or complete the marking reaction, if necessary, depending upon the particular type of recording paper employed. A paper tensioning bar 74 is pivotally mounted between rocker arms 30 at a point between linear electrode 34 and idler roller 52, and serves to provide and maintain intimate contact of the recording paper with heater 70 as the paper is withdrawn from the machine and across the upper surface of the heater. It has been found that this tensioning of the recording paper serves to promote efficient drying of the paper, in that, it produces a "squeegee" effect within the paper.

The remaining elements of the paper supply and feed system of the invention will be described and identified in connection with a description of the operation of the system as set forth in the following passages.

When it becomes necessary for an operator of the recorder to reload the paper supply chamber or service either the linear or helical electrodes, the machine is stopped and the rocker arm assembly pivoted to a raised or open position as best seen by reference to Fig. 2 of the drawings, thereby exposing paper supply chamber 48. A pair of access screws 76 mounted on the chamber are loosened a suitable distance permitting opening of closure member 78 which is hinged with a piano-type hinge 80 to the cylindrical container 56. With closure member 78 in an open position, as best seen by reference to Fig. 1 of the drawings, the paper supply roll 58 is removed from the roll-retaining brackets 82 which may consist of a simple pair of spaced axles, one of which is spring-loaded to engage suitable bearing surfaces provided on the supply roll. Following insertion of a fresh roll of recording paper, the supply chamber is closed with a short length of the recording paper being withdrawn from the supply roll through exit slot 60 to provide access to the paper when the container has been sealed. The recording paper is then withdrawn a suitable length to permit passage through the space indicated by reference numeral 84 in Figs. 1 and 2 between idler roller 52 and drive roller 16. The paper in this position has been illustrated in Fig. 2 of the drawings by dotted lines. A suitable external recording paper guide shelf 86 is provided on the recorder to guide passage of the paper from the recorder following marking.

With the paper positioned as indicated in the foregoing paragraph, the rocker arm assembly carrying the paper supply chamber and linear electrode is pivoted or lowered to the position indicated in Fig. 3 of the drawings, thereby automatically bringing the electrodes, recording paper, paper tensioning roller, paper drier, and the drive roller and cooperating idler roller into operative positions. The operator is now free to commence the recording cycle by simply actuating the prime mover in conventional manner.

As will be readily apparent, with the paper supply and feed system of the invention, it is possible for an operator to clean, repair or replace the linear electrode or clean the helical electrode by simply repeating the procedure described above and the machine may be returned to an operative condition with a minimum of effort and time.

Whereas the invention has been described with respect to a specific embodiment, it is considered to be apparent that various modifications can be made in this structure without departing from the true scope of our invention which is more accurately defined within the appended claim.

What is claimed is:

In a facsimile recorder provided with a stationary linear electrode and a cooperating rotating helical electrode between which recording paper is passed to effect marking thereof in response to signal intelligence transmitted to the electrodes, a recording paper feed system comprising, a recorder frame, a pair of spaced parallel rocker arms each pivotally mounted at one end thereof to said frame adjacent the discharge point for printed copy and adapted to be pivoted between a printing position and loading position, linear electrode means secured between said rocker arms and positioned to engage the helical electrode of the recorder through said recording paper when the rocker arms are in their printing position, recording paper supply means secured between said rocker arms near the free ends thereof, said paper supply means comprising a hollow cylindrical container provided with paper roll holding means and having an elongated paper exit slot therein, a paper baffle plate bordering said slot substantially normal to the surface of said container and extending from the container to the point of passage of paper beneath the linear electrode, flexible flap means secured to said container overlying said baffle plate and substantially sealing the interior of said container from the atmosphere, whereby moist electrolytic recording paper may be delivered substantially to the point of recording without any appreciable drying taking place, idler drive means rotatably mounted between said rocker arms adjacent the pivotally mounted ends thereof, and drive bar means mounted on said frame and positioned to engage the idler drive means to withdraw recording paper from said paper supply means between the linear electrode and rotating helical electrode when said rocker arms are in their printing position.

References Cited in the file of this patent

UNITED STATES PATENTS

| | | |
|---|---|---|
| 2,391,765 | Artzt | Dec. 25, 1946 |
| 2,621,999 | Alden | Dec. 16, 1952 |

FOREIGN PATENTS

| | | |
|---|---|---|
| 469,272 | Great Britain | July 22, 1937 |